(12) United States Patent
Zotov et al.

(10) Patent No.: US 10,036,652 B2
(45) Date of Patent: Jul. 31, 2018

(54) UTILIZATION OF MECHANICAL QUADRATURE IN SILICON MEMS VIBRATORY GYROSCOPE TO INCREASE AND EXPAND THE LONG TERM IN-RUN BIAS STABILITY

(71) Applicant: The Regents of the University of California, Oakland, CA (US)

(72) Inventors: Sergey A. Zotov, Westminster, CA (US); Brenton R. Simon, Irvine, CA (US); Igor P. Prikhodko, Westminster, CA (US); Alexander A. Trusov, Studio City, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 458 days.

(21) Appl. No.: 14/630,387

(22) Filed: Feb. 24, 2015

(65) Prior Publication Data

US 2015/0285658 A1 Oct. 8, 2015

Related U.S. Application Data

(60) Provisional application No. 61/943,889, filed on Feb. 24, 2014.

(51) Int. Cl.
*G01C 25/00* (2006.01)
*G01C 19/5776* (2012.01)

(52) U.S. Cl.
CPC ......... *G01C 25/00* (2013.01); *G01C 19/5776* (2013.01)

(58) Field of Classification Search
CPC ... G01C 25/00; G01C 19/5776; G01C 25/005
USPC .......... 73/1.77, 497, 503.23, 504.02–504.16, 73/504.18; 702/92–95, 104
See application file for complete search history.

(56) References Cited

U.S. PATENT DOCUMENTS

| 2009/0217757 A1* | 9/2009 | Nozawa | G01C 19/5607 73/504.12 |
| 2013/0031950 A1* | 2/2013 | Donadel | G01C 19/5776 73/1.77 |

* cited by examiner

*Primary Examiner* — Robert R Raevis
(74) *Attorney, Agent, or Firm* — Marcus C. Dawes; Daniel L. Dawes

(57) ABSTRACT

A method for self-compensation of the bias draft of the quadrature signal of a gyroscope. The method is a combination of a variety of sub-methods, which can include quadrature compensation, can be used to achieve the highest possible stability. The calibration methods include a temperature self-sensing algorithm utilizing the drive-mode resonance frequency for calibration of thermal drift in the mechanical parameters of the system, a sideband-ratio approach for direct detection of mechanical drive-mode amplitude, modifying the AC and DC components of the amplitude gain control (AGC) for improved stability, and an approach for compensation of thermal drift in the sense-mode pick off system by utilizing mechanical quadrature. By using some or all of the four methods of calibration above, the highest level of long term in-run bias stability can be achieved.

23 Claims, 3 Drawing Sheets

UTILIZATION OF MECHANICAL QUADRATURE IN SILICON MEMS VIBRATORY GYROSCOPE TO INCREASE AND EXPAND THE LONG TERM IN-RUN BIAS STABILITY

RELATED APPLICATIONS

This application claims priority to, and the benefit of the earlier filing date of: US provisional patent application entitled "Utilization of Mechanical Quadrature in Silicon MEMS Vibratory Gyroscope to Increase and Expand the Long Term In-Run Bias Stability," filed on Feb. 24, 2014, Ser. No. 61/943,889, pursuant to 35 USC 120, the contents of which are incorporated herein by reference.

STATEMENT OF GOVERNMENT SUPPORT

This invention was made with government support under Grant N66001-12-C-4035, awarded by the Defense Advanced Research Projects Agency (DARPA), the government has certain rights in the invention.

BACKGROUND

Field of the Technology

The current invention relates to the field of gyroscopes, specifically methods of improving the long term in-run bias stability of Coriolis vibratory gyroscopes.

Description of the Prior Art

The level of long term instability of bias and scale factor are key characteristics defining the utilization of gyroscopes in many practical applications, including navigation, positioning, and targeting systems. Thermal sensitivity of system's components accounts for the first order drift mechanisms of gyroscopes. Thermal variations are typically identified and calibrated by utilizing the linear dependence of the gyroscope bias on the drive-mode resonant frequency. This approach, however, only captures the thermal drift of the mechanical parameters, as reflected in the mechanical resonant frequency of the device. The thermal sensitivity of other system components, such as electronic gains, remains unobservable.

The level of long term instability of bias and scale factor are key characteristics defining the utilization of gyroscopes in many practical applications, including navigation, positioning, and targeting systems. Thermal sensitivity of system's components accounts for the first order drift mechanisms of gyroscopes.

Thermal variations are typically identified and calibrated by utilizing the linear dependence of the gyroscope bias on the drive-mode resonant frequency. This approach, however, only captures the thermal drift of the mechanical parameters, as reflected in the mechanical resonant frequency of the device. The thermal sensitivity of other system components, such as electronic gains, remains unobservable.

The thermal drifts of the electronic components for the drive-mode can be avoided by using the Side Band Ratio (SBR) method. The SBR algorithm takes advantage of the non-linearity of parallel-plate sense capacitors, allowing a direct measurement of large mechanical amplitudes. This direct measurement of mechanical amplitude can be used by a type of amplitude gain control (AGC), for the purpose of creating a steady-state mechanical amplitude of the resonator. In response to this amplitude, the AGC creates an AC signal, possibly then mixing it with a DC signal, and feeding the result back into the resonator as a forcing function. Modification to both the AC and DC control voltages can also be used for the purpose of resonator control. This method can only be applied to the drive-mode, leaving the drift in sense-mode electronic components unobservable. Thus, there is a need to find a method of capturing the bias drift of the sense mode, which can be a combination of both thermal drift in the pick off components, or other sources of bias drift as well, such as due to acceleration or aging of the device. Compensation of these effects can increase long-term stability of both in-run bias and scale factor.

What is needed is an algorithm that incorporates the quadrature signal for the in-run calibration of bias. Quadrature is typically considered a parasitic signal in gyroscopes which distorts the rotation-induced response of the sensor. It is preferred that a quadrature signal could be utilized for compensation of thermal drift in sense mode detection system. Variations in the quadrature signal should also be used to compensate for the parasitic-induced rotation response, thus minimizing the influence of thermal drift in electronics.

BRIEF SUMMARY

This disclosure reports a new approach for improvement of the long term in-run bias stability of Coriolis vibratory gyroscopes. We are claiming two novel techniques for the purpose of gyroscope calibration: 1) Utilizing the mechanical quadrature error, and 2) Utilizing the voltages of the amplitude gain control (AGC) of the drive-mode (or any other feedback loop for keeping amplitude constant).

In addition, we are claiming the use of the following techniques, for the purpose of gyroscope self-calibration: 1) signals from the Side-Band Ratio (SBR) detection technique.

Note that the Side-Band Ratio (SBR) has been previously demonstrated; however, we are claiming the use of this technique for the purpose of stabilizing the mechanical amplitude of the gyroscope, as part of an input into a feedback control loop or feed-forward calibration algorithm.

Finally, we are claiming the use of any combination of the above techniques, including the natural (or operational) frequencies of the resonator (known as the temperature self-sensing method), for the purpose of the compensation of bias and/or scale factor drift of gyroscopes. Note that the use of the resonator frequency for the purpose of self-calibration has previously been demonstrated, but we are including it within our combination of techniques for long-term drift compensation of bias and scale factor drift.

The proposed approach was validated by a silicon Quadruple Mass Gyroscope, with the natural frequency of 3 kHz, frequency mismatch of <0.5 Hz, and isotropic quality factor of 950, vacuum packaged without getter. The algorithm is described and experimentally demonstrated in this disclosure, showing a bias stability of 0.1 deg/hr after 300 seconds, and importantly, retaining that value for over 3 hours of the integration time.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

Figure 1:
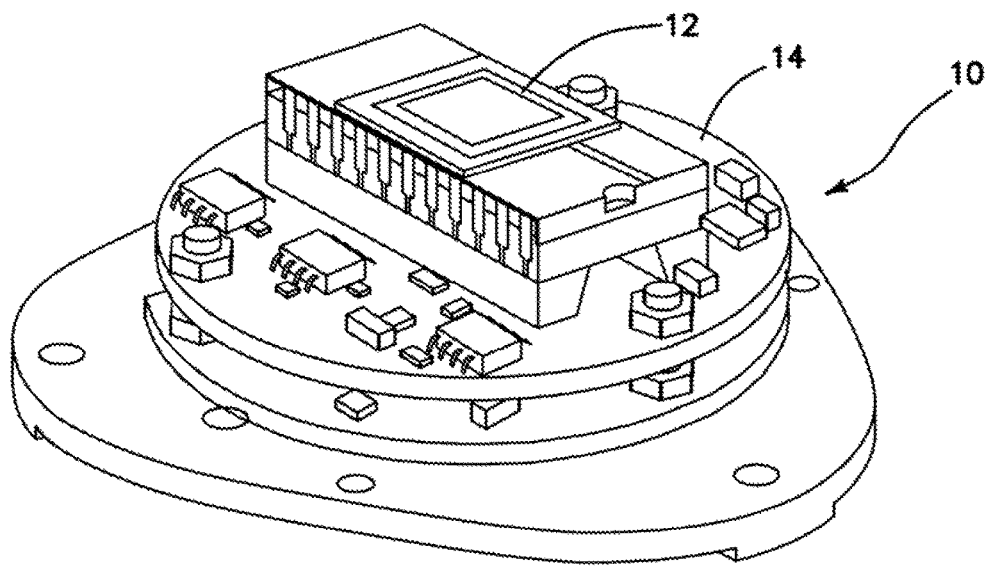
FIG. 1 is a perspective view of the current device, namely a quadruple mass gyroscope mounted on a two stage printed circuit board.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

In this disclosure, we describe and experimentally demonstrate how the quadrature signal can be utilized for self-compensation of bias drift. It is also described how a combination of a variety of methods, which can include quadrature compensation, can be used to achieve the highest possible stability. The following calibration methods are discussed: a temperature self-sensing algorithm utilizing the drive-mode resonance frequency for calibration of thermal drift in the mechanical parameters of the system, a sideband-ratio approach for direct detection of mechanical drive-mode amplitude, modifying the AC and DC components of the amplitude gain control (AGC) for improved stability, and an approach for compensation of thermal drift in the sense-mode pick off system by utilizing mechanical quadrature. By using some or all of the four methods of calibration above, the highest level of long term in-run bias stability can be achieved.

The level of long term instability of bias and scale factor are key characteristics defining the utilization of gyroscopes in many practical applications, including navigation, positioning, and targeting systems. Thermal sensitivity of system's components accounts for the first order drift mechanisms of gyroscopes. Thermal variations are typically identified and calibrated by utilizing the linear dependence of the gyroscope bias on the drive-mode resonant frequency. This approach, however, only captures the thermal drift of the mechanical parameters, as reflected in the mechanical resonant frequency of the device. The thermal sensitivity of other system components, such as electronic gains, remains unobservable. The thermal drifts of the electronic components for the drive-mode can be avoided by using the Side Band Ratio (SBR) method. The SBR algorithm takes advantage of the non-linearity of parallel-plate sense capacitors, allowing a direct measurement of large mechanical amplitudes. This direct measurement of mechanical amplitude can be used by a type of amplitude gain control (AGC), for the purpose of creating a steady-state mechanical amplitude of the resonator. In response to this amplitude, the AGC creates an AC signal, possibly then mixing it with a DC signal, and feeding the result back into the resonator as a forcing function. Modification to both the AC and DC control voltages can also be used for the purpose of resonator control. This method can only be applied to the drive-mode, leaving the drift in sense-mode electronic components unobservable. Thus, there is a need to find a method of capturing the bias drift of the sense mode, which can be a combination of both thermal drift in the pick off components, or other sources of bias drift as well, such as due to acceleration or aging of the device. Compensation of these effects can increase long-term stability of both in-run bias and scale factor.

For this purpose, we introduce an algorithm that incorporates the quadrature signal for the in-run calibration of bias. Quadrature is typically considered a parasitic signal in gyroscopes which distorts the rotation-induced response of the sensor. We show in this disclosure that the quadrature signal can be utilized for compensation of thermal drift in sense mode detection system. We demonstrated that variations in the quadrature signal can be used to compensate for the parasitic-induced rotation response, thus minimizing the influence of thermal drift in electronics.

In this disclosure, we describe and experimentally demonstrate how the quadrature signal can be utilized for self-compensation of bias drift, as well as the combination of a variety of methods, which can include quadrature compensation, to achieve the highest possible stability. The following calibration methods are discussed: a temperature self-sensing algorithm utilizing the drive-mode resonance frequency for calibration of thermal drift in the mechanical parameters of the system, a sideband-ratio approach for direct detection of mechanical drive-mode amplitude, modifying the AC and DC components of the amplitude gain control (AGC) for improved stability, and an approach for compensation of thermal drift in the sense-mode pick off system by utilizing mechanical quadrature. By using some or all of the four methods of calibration above, the highest level of long term in-run bias stability can be achieved.

A Silicon Quadruple Mass Gyroscope (QMG) was used for a proof of the proposed concepts. The device is seen in FIG. 1 and is generally denoted by reference numeral 10. The QMG 12 comprises four tines, each coupled with external levers to force the anti-phase resonance. Both the physical structure and interface electrodes of the gyroscope 12 are completely symmetric. The design used two sets of differential parallel plate electrodes attached to each mass and along each axis. The devices were fabricated using in-house silicon on insulator fabrication process, with device layer thickness of 100 microns, and sealed under moderate vacuum. A vacuum-packaged QMG 12 is mounted to a printed circuit board 14 as seen in FIG. 1. All results discussed in further detail below were obtained using a QMG 12 with the following mechanical parameters: a natural frequency of 3050 Hz, a mechanical frequency mismatch of less than 0.5 Hz, and an isotopic Q-factor of 950.

Figure 2:
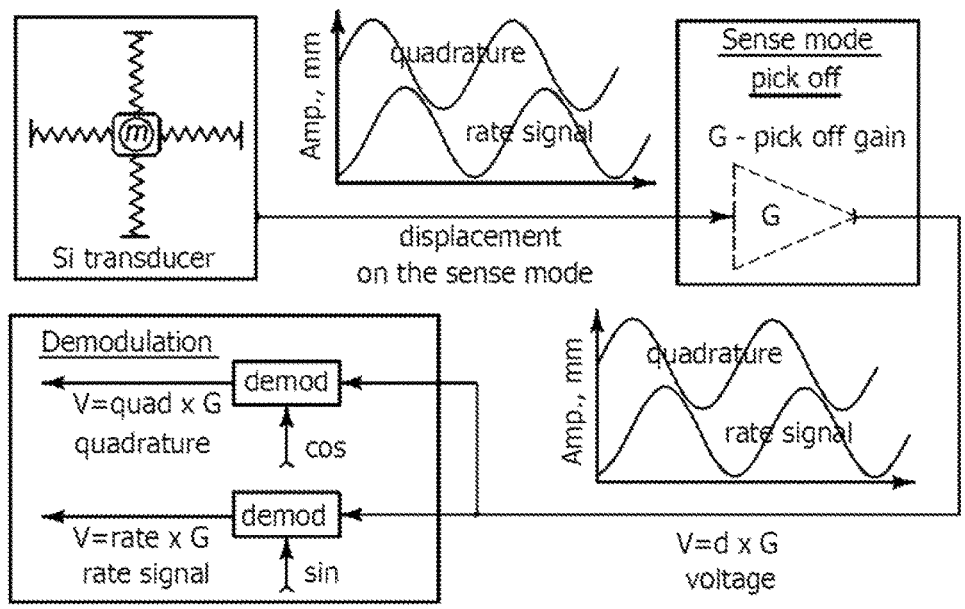
FIG. 2 is a schematic diagram of the electronic drift mechanism, showing an identical pick-off gain G, for both the rate signal and quadrature.

Quadrature is typically considered a parasitic signal in gyroscopes which distorts the rotation-induced response of the sensor. We experimentally demonstrated that the quadrature signal can in fact be utilized for compensation of thermally induced drift in the sense mode detection system. This is accomplished by observing that the rotation-induced response and quadrature are two components of one physical signal that feeds through the pick-off sense electronics. The amplitudes of both components (rotation-induced response and quadrature) change proportionally and in response to variations in mechanical structure and parameters of the control electronics as seen in FIG. 2. Using this observation, variations in the quadrature signal can be used to compensate for the rotation induced response, thus minimizing the influence of thermal drift in electronics.

To validate this approach, the zero-rate output of the gyroscope 12 and quadrature signals were collected for 12 hours. During this period of time, temperature drifted in the range of 1.5° C., and was monitored by use of a temperature self-sensing method.

Figure 3:
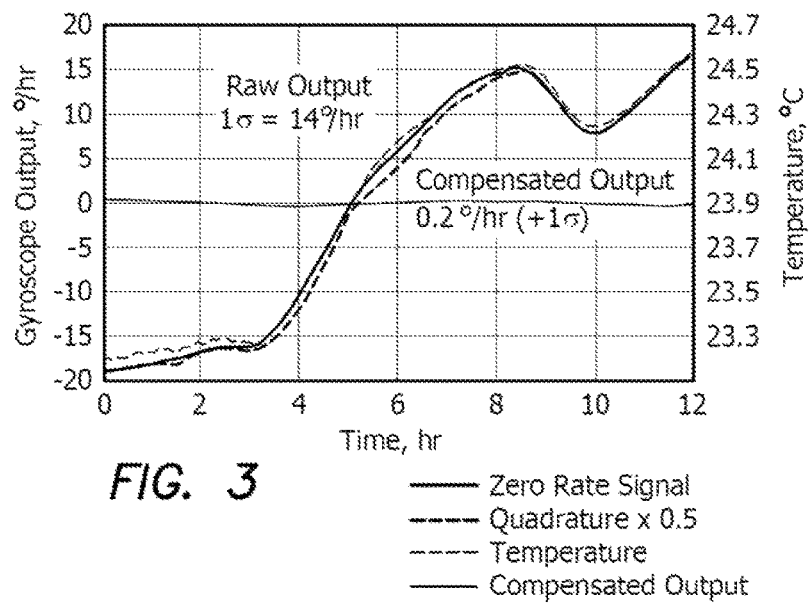
FIG. 3 is a graph of gyroscope output and temperature versus time obtained from the algorithm for gyroscope self-calibration using drive-mode frequency and quadrature for bias drifts cancellation.

A measured 99.85 percent correlation between the quadrature and the gyroscope bias confirmed that the changes in the rate signal due to pick off gain drift can be effectively reduced as seen in FIG. 2. Uncompensated gyroscope output revealed a 14°/hr (+1a) bias uncertainty over a dynamic temperature range of 1.5° C. The calibration utilizing both the drive-mode frequency and quadrature of the device removed the bias drift of the device, yielding a 0.2°/hr (+1a) bias uncertainty as seen in FIG. 3.

The current method is the simultaneous implementation of a combination of four calibration methods: frequency temperature self-sensing, sideband-ratio detection, modification of the AC and DC components of the amplitude gain control, and quadrature compensation. While both frequency self-sensing and the sideband-ratio detection methods have been previously demonstrated, the use of these techniques for the purpose of gyroscope calibration has not been previously described. In addition, the quadrature compensation technique in its entirely, is both presented as a novel approach for detection, as well as a means for gyroscope calibration. The combination of some, or all of these techniques allow for the highest level of self-calibration of drift in the gyroscope 12, which includes drift of the mechanical transducer, as well as drift of drive-mode and sense-mode detection electronics.

Figure 4:
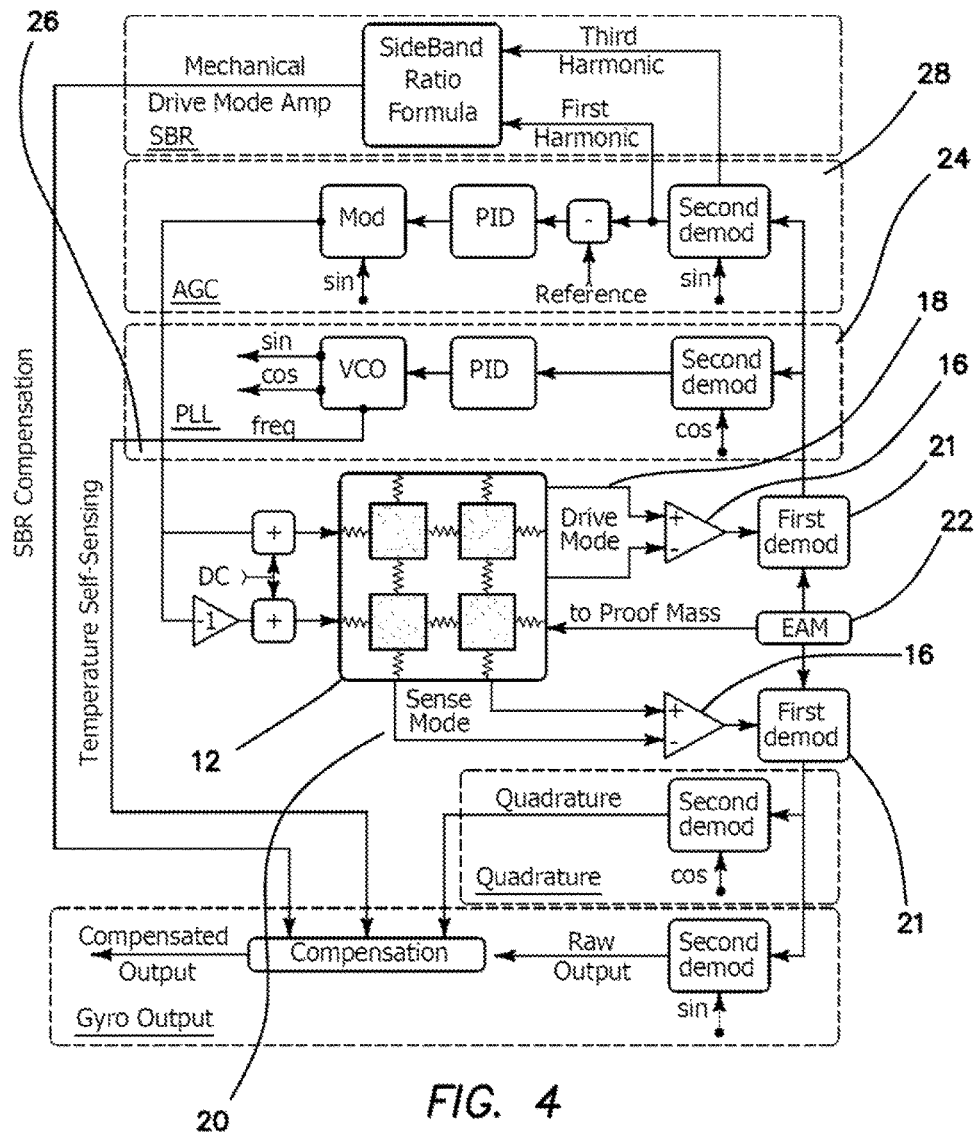
FIG. 4 is a flow diagram of the current method of signal processing for self-calibration of long term in-run gyroscope bias drift using three simultaneous calibration methods: temperature self-sensing, sideband-ratio detection, and quadrature compensation.

To illustrate this approach, a vacuum-packaged QMG 12 was mounted to a printed circuit board 14, containing a signal detection electronics assembly. As best seen in FIG. 4, front-end amplification of the output signals was done using two trans-impedance and instrumentation amplifiers 16 for each drive-mode output 18 and sense-mode output 20. The processing was implemented on a real-time DSP field-programmable gate array lock-in amplifier HF2 from Zurich Instruments. Separation of the useful signal from the feedthrough signal was accomplished using Electromechanical Amplitude Modulation (EAM) 22. Instead of using a DC bias, an AC carrier voltage of 2.5 V at 52 kHz was applied to the proof mass by the EAM 22, resulting in the amplitude modulation of the motional signal. The signals of both the drive- and sense-modes 18, 20 were fed to phase-locked loops (PLLs) 24, which provided a continual operation of the gyroscope 12 at mechanical resonance. The frequency provided by the PLL 24 was used as an input 26 to the temperature self-sensing algorithm and utilized for the compensation of temperature-induced bias drifts of the silicon transducer. Through temperature characterization of the gyroscope 12, the Temperature Coefficient of Frequency (TCF) was derived to be −20 ppm/° C. Combined with the 0.08 ppm frequency stability of the device 10, a temperature self-sensing accuracy of 4° mC was demonstrated.

The drive-mode amplitude 18 of the gyroscope 12 was stabilized through the use of an Automatic Gain Control (AGC) 28, which traditionally utilizes the first harmonic of the drive-mode detected signal. In addition to the first harmonic, higher order harmonics are produced by the demodulation of the signal. These higher order harmonics are influenced by the mechanical amplitude of the transducer, and therefore can be used to isolate the parasitic information from the useful pickoff signal. By separating these two factors, a steady mechanical amplitude can be maintained, as well as accomplishing the compensation of the drift in the drive-mode electronics.

Figure 5:
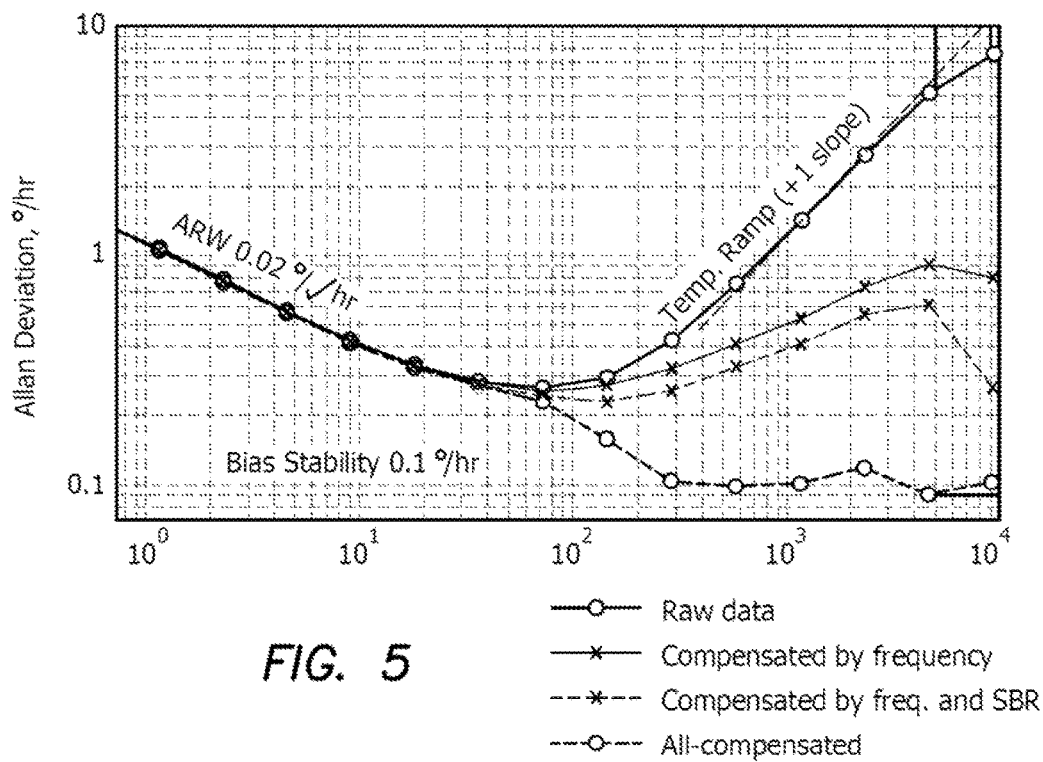
FIG. 5 is a graph of the measured Allan deviation of the gyroscope's zero rate output versus time.

Compensation of the sense-mode electronic drift was extracted from the quadrature signal of the sensor by taking advantage of the identical pick-off gains, G, for both the rotation-induced response and quadrature. Allan deviation analysis of the raw gyroscope output demonstrated an angle random walk of 0.02°/hr, bias instability of 0.3°/hr, and a +1 slope temperature ramp at time constants above 100 seconds, as demonstrated by curve 1 seen in FIG. 5. Implementation of the temperature self-sensing approach alone represented by curve 2, and in combination with the SBR method represented by curve 3, allows for the partial compensation of gyroscope thermal drift. In contrast, the fully calibrated gyroscope, which utilizes all three calibration methods, removed the +1 slope, revealing the bias uncertainty of 0.1°/hr after 300 seconds, and retained this value for over 3 hours as represented by curve 4 in FIG. 5 which was limited only by the duration of experiment.

Thus, we have demonstrated a new approach for increasing and expanding the long-term in-run bias stability of a silicon MEMS vibratory gyroscope 12. This approach is based on utilization of gyroscope quadrature error for the compensation of parameter variation in the sense-mode detection system. Implementation of the proposed approach, along with side-band ratio and temperature self-sensing calibration methods, revealed a temperature-immune gyroscope output with long-term in-run bias uncertainty of 0.1°/hr after 300 seconds, while retaining this value for over 3 hours.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method of stabilizing operation of a Coriolis vibratory gyroscope comprising:
   utilizing the mechanical quadrature error for compensation of thermal drift in a sense mode detection system in the gyroscope; and
   utilizing an output of an amplitude gain control unit (AGC) of a drive-mode unit in the gyroscope for keeping amplitude constant.

2. The method of claim 1 further comprising generating a side band ratio SBR mechanical drive mode amplitude signal; and compensating a raw output from the gyroscope with the side band ratio SBR mechanical drive mode amplitude signal to stabilize the mechanical amplitude of the gyroscope.

3. The method of claim 2 further comprising utilizing natural or operational frequencies of the gyroscope by a temperature self-sensing method for the purpose of the compensation of bias and/or scale factor drift of the gyroscope.

4. The method of claim 1 where utilizing the mechanical quadrature error for compensation of thermal drift in a sense mode detection system in, the gyroscope comprises:
   compensating a raw output from the gyroscope using a signal derived from a temperature self-sensing algorithm utilizing a drive-mode resonance frequency for calibration of thermal drift in mechanical parameters of the gyroscope;
   compensating the raw output from the gyroscope using a sideband-ratio method for direct detection of mechanical drive-mode amplitude;
   feeding back modified AC and DC components of an amplitude gain control (AGC) signal to, a drive unit in the gyroscope for improved stability; and
   compensating thermal drift in a sense-mode pick off electronic unit in the gyroscope by utilizing a mechanical quadrature signal.

5. The method of claim 1 where utilizing the mechanical quadrature error for compensation of thermal drift in sense mode detection system in the gyroscope comprises:
   vibrating a resonator of the gyroscope with a sense mode;
   measuring a rotation-induced response signal and a quadrature signal of the sense mode using a plurality of inertial sensors within the gyroscope;
   observing an amplitude of the rotation-induced response signal and the quadrature signal;
   determining a variation between the rotation-induced response signal and the quadrature signal; and
   using the determined variation between the rotation-induced response signal and the quadrature signal of the sense signal to compensate for the rotation-induced response and minimizing the amount of thermal drift within the gyroscope.

6. The method of claim 5 further comprising using the determined variation between the rotation-induced response signal and the quadrature signal of the sense signal to compensate for the acceleration-induced drift of the output signal of the gyroscope.

7. The method of claim 5 further comprising using the determined variation between the rotation-induced response signal and the quadrature signal of the sense signal to determine the acceleration of the gyroscope.

8. The method of claim 5, where the gyroscope is a Coriolis Vibratory Gyroscope (CVG).

9. The method of claim 8 further comprising using the determined variation between the rotation-induced response signal and the quadrature signal of the sense signal to determine the bias of the CVG.

10. The method of claim 8 further comprising using the determined variation between the rotation-induced response signal and the quadrature signal of the sense signal to compensate forte scale factor of the CVG.

11. The method of claim 1 where utilizing the mechanical quadrature error for compensation of thermal drift in a sense mode detection system in the gyroscope comprises:
   obtaining a result from a temperature self-sensing algorithm;
   determining a mechanical drive-mode amplitude of the inertial sensor from a sideband ratio formula;
   determining a quadrature signal from a sense signal of the inertia sensor; and
   providing a compensated output of the inertial sensor by combining the result from the temperature self-sensing algorithm, the mechanical drive-mode amplitude of the inertial sensor from the sideband ratio formula, and the quadrature signal.

12. The method of claim 11 further comprising feeding the determined mechanical drive-mode amplitude from the sideband ratio formula back into the inertial sensor as a arcing function for controlling the inertial sensor.

13. The method of claim 12 where feeding the determined mechanical drive-mode amplitude from the sideband ratio formula back into the inertial sensor as a forcing function comprises:
   creating an AC signal in response to the determined mechanical drive-mode amplitude;
   mixing the AC signal with a DC signal; and
   feeding the mixed AC-DC signal into the gyroscope as a forcing function.

14. The method of claim 13 further comprising modifying a voltage of the AC and/or the DC signal to further control the inertial sensor.

15. The method of claim 11, where the inertial sensor is a Coriolis Vibratory Gyroscope (CVG).

16. The method of claim 11 where the inertial sensor is an accelerometer.

17. The method of claim 11 wherein providing a compensated output of the inertial sensor comprises providing, a self-compensated output free from the non-inertial effects of the inertial sensor.

18. The method of claim 11 wherein providing a compensated output of the inertial sensor comprises providing a elf-compensated output free from the acceleration of the inertial sensor.

19. The method of claim 1 where utilizing the mechanical quadrature error for compensation of thermal drift in a sense mode detection system in the gyroscope comprises calibrating for the non-inertial effects and/or acceleration of an inertial sensor comprising a combination of at least two of the following measurements:

a quadrature signal of a sense mode of the inertial sensor;
a mechanical drive-made amplitude of the inertial sensor determined from a sideband ratio formula;
a natural frequency of the inertial sensor; and
a voltage utilized by a feedback loop to keep the amp de of the inertial sensor constant.

20. The method of claim 19, where the inertial sensor is, a Coriolis Vibrator Gyroscopes (CVG).

21. The method of claim 19 wherein calibrating for the non-inertial effects and/or acceleration of an inertial sensor comprises calibrating for the thermal drifts of the inertial sensor.

22. The method of claim 19 wherein calibrating for the non-inertial effects and/or acceleration of an inertial sensor comprises calibrating for the thermal drifts of the inertial sensor.

23. The method of claim 19 wherein calibrating for the non-inertial effects and/or acceleration of an inertial sensor comprises calibrating for the aging, drifting values of the physical transducer parameters of the inertial sensor, and/or of the electronics of the inertial sensor.

* * * * *